United States Patent
Haon et al.

(10) Patent No.: US 12,449,688 B2
(45) Date of Patent: Oct. 21, 2025

(54) DEVICE FOR IMAGING ELECTRICAL ACTIVITY OF A SAMPLE, IMAGING SYSTEM, METHOD FOR ANALYSING A SAMPLE AND MANUFACTURING METHOD THEREFOR

(71) Applicant: COMMISSARIAT À L'ENERGIE ATOMIQUE ET AUX ENERGIES ALTERNATIVES, Paris (FR)

(72) Inventors: Olivier Haon, Grenoble (FR); Benoit Racine, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/765,874

(22) Filed: Jul. 8, 2024

(65) Prior Publication Data

US 2025/0013094 A1    Jan. 9, 2025

(30) Foreign Application Priority Data

Jul. 7, 2023 (FR) ...................................... 2307290

(51) Int. Cl.
G02F 1/1334 (2006.01)
C09K 19/54 (2006.01)

(52) U.S. Cl.
CPC .......... *G02F 1/1334* (2013.01); *C09K 19/544* (2013.01); *C09K 2019/546* (2013.01)

(58) Field of Classification Search
CPC ................ G02F 1/1334; C09K 19/544; C09K 2019/546; G01N 33/4836
See application file for complete search history.

(56) References Cited

U.S. PATENT DOCUMENTS

2015/0261024 A1    9/2015 Chung et al.
2018/0373083 A1*  12/2018 Belloir ................ G02F 1/13439

OTHER PUBLICATIONS

Preliminary Search Report and Written Opinion as issued in French Patent Application No. 2307290, dated Feb. 21, 2024.
Search Report as issued in French Patent Application No. 2307290, dated Feb. 21, 2024.
Wee, D., et al., "Thermal-induced optical modulation of liquid crystal embedded polymer film on silver nanowire heater", Solar Energy Materials and Solar Cells, Elsevier Science Publishers, vol. 147, Dec. 2015 pp. 150-156, XP029397258.
Tokuda, T., et al., "Optical and Electric Multifunctional CMOS Image Sensors for On-Chip Biosensing Applications", Materials, vol. 4, No. 1, Dec. 2010, pp. 84-102, XP055347233.

(Continued)

*Primary Examiner* — Charles S Chang
(74) *Attorney, Agent, or Firm* — Pillsbury Winthrop Shaw Pittman LLP

(57) ABSTRACT

A device for imaging electrical activity of a sample, includes a polymer film in which liquid crystal droplets are dispersed, referred to as the PDLC film, a transparent fluidic component in which at least one cavity adapted to contain the sample is arranged, a transparent reference electrode, the PDLC film being arranged between the at least one cavity and the reference electrode and configured to convert an electric field created in a region of the PDLC film in response to an electric potential generated by the sample into a variation in transparency of the region of the PDLC film.

19 Claims, 7 Drawing Sheets

(56) References Cited

OTHER PUBLICATIONS

Wang, P.-C., et al., "Integration of polymer-dispersed liquid crystal composites with conducting polymer thin films toward the fabrication of flexible display devices," Displays 28 (Year: 2007), pp. 101-104.

Prusińska-Kurstak, E., et al., "Elastic polymer-dispersed liquid crystal electrooptic transducers," Journal of Molecular Liquids 267 (Year: 2018), pp. 127-130.

Lambacher, A., et al., "Electrical imaging of neuronal activity by multi-transistor-array (MTA) recording at 7.8 µm resolution," Appl. Phys. A 79, pp. 1607-1611 (Year: 2004).

Sharma, V., et al., "Preparation and electrooptic study of reverse mode polymer dispersed liquid crystal: Performance augmentation with the doping of nanoparticles and dichroic dye," Journal of Applied Polymer Science, (Year: 2020), 10 pages.

Hutzler, M., et al., "High-Resolution Multitransistor Array Recording of Electrical Field Potentials in Cultured Brain Slices," J Neurophysiol 96: pp. 1638-1645, (Year: 2006).

Perju, E., et al., "Polymer-dispersed liquid crystal composites for bio applications: thermotropic, surface and optical properties," Liquid Crystals, (Year: 2015) vol. 42, No. 3, pp. 370-382.

Voelker, M., et al., "Signal Transmission from Individual Mammalian Nerve Cell to Field-Effect Transistor," $2^{nd}$ Advanced Optical Metrology Compendium, small (Year: 2005), 1, No. 2, pp. 206-210.

\* cited by examiner

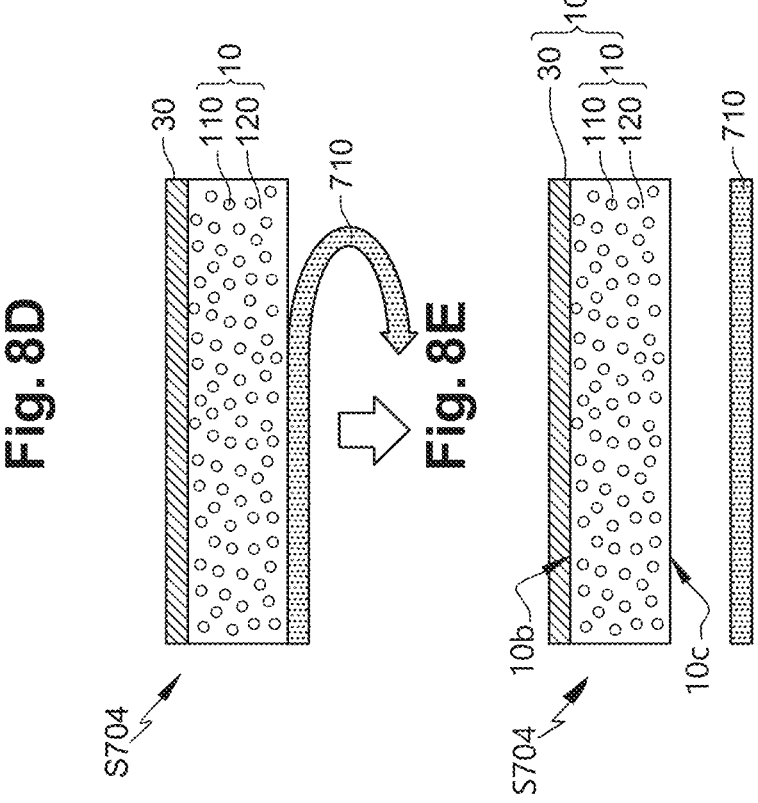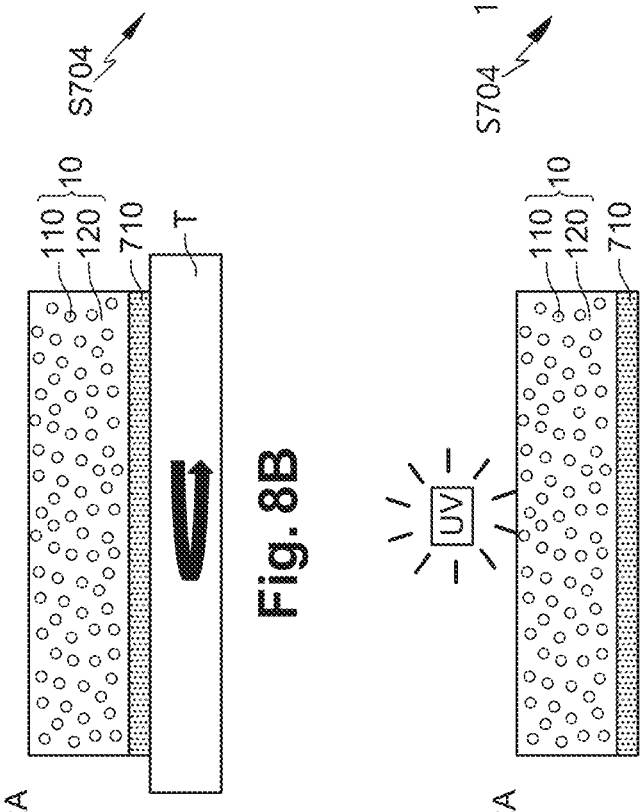

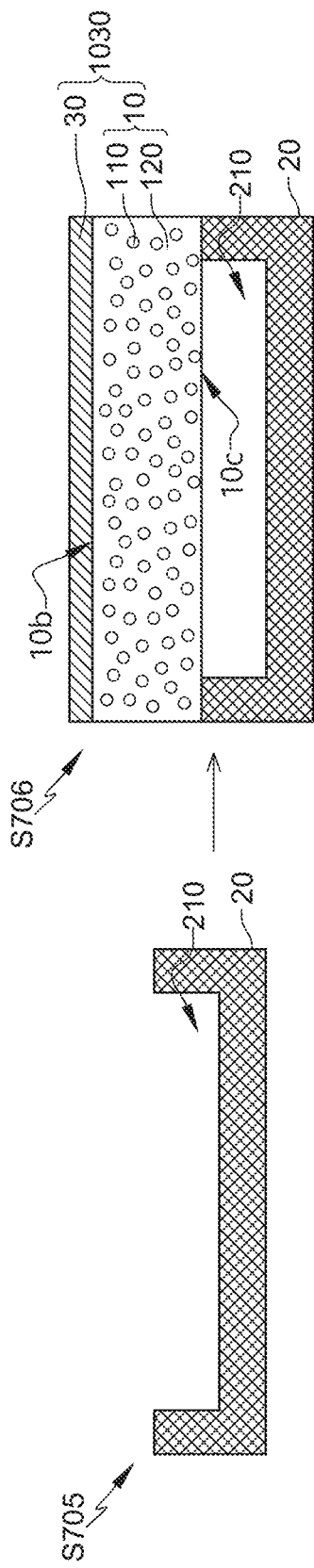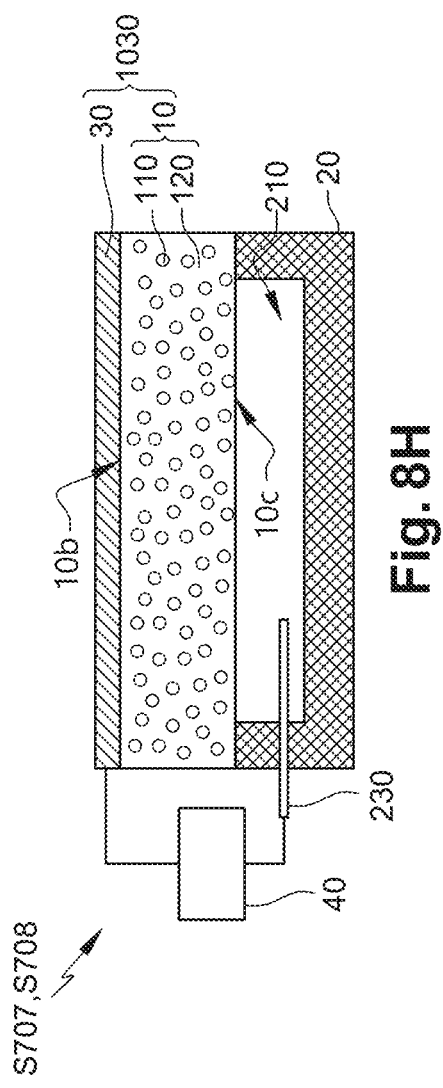
Fig. 8G
Fig. 8H

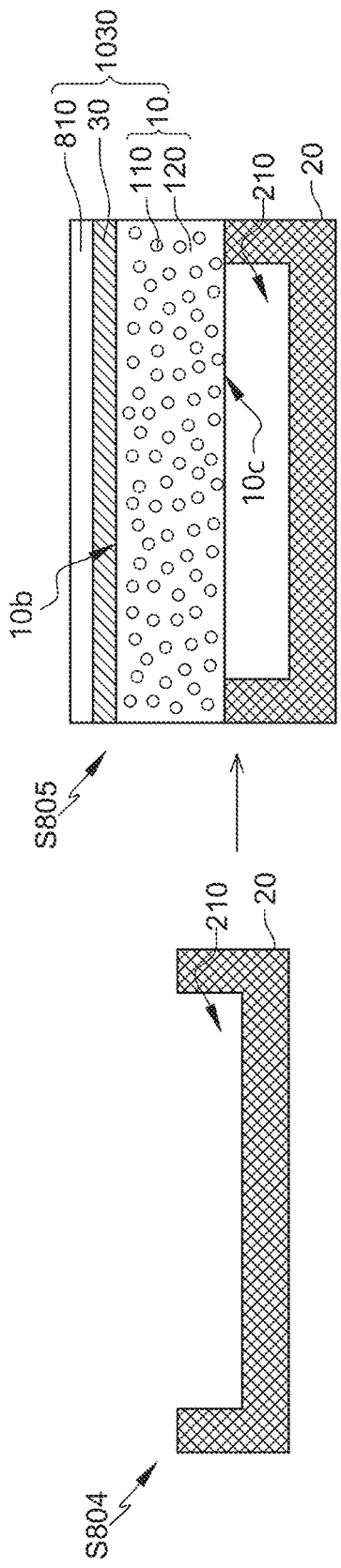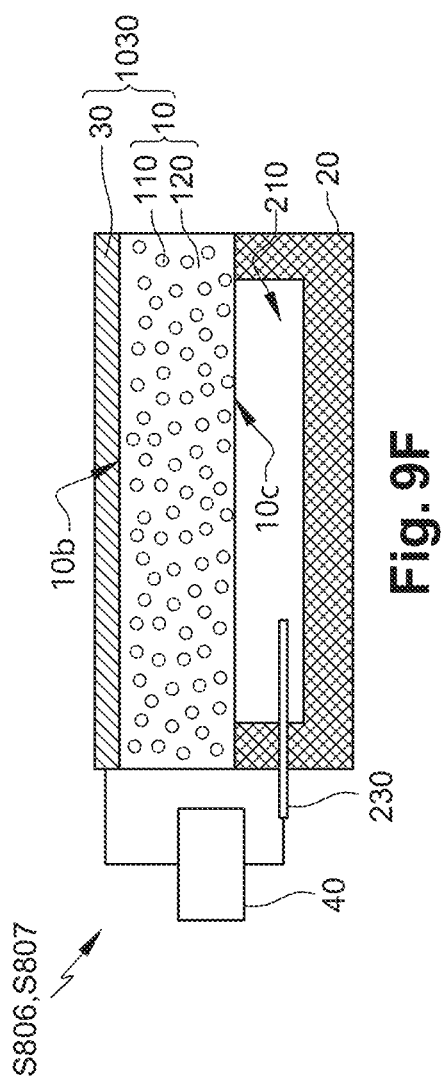
Fig. 9E
Fig. 9F

DEVICE FOR IMAGING ELECTRICAL ACTIVITY OF A SAMPLE, IMAGING SYSTEM, METHOD FOR ANALYSING A SAMPLE AND MANUFACTURING METHOD THEREFOR

CROSS-REFERENCE TO RELATED APPLICATIONS

This application claims priority to French Patent Application No. 2307290, filed Jul. 7, 2023, the entire content of which is incorporated herein by reference in its entirety.

FIELD

The technical field of the invention is related to the analysis of a sample, for example a biological sample, by an imaging system.

The invention relates to an imaging device for analysing a sample, an imaging system, a method for analysing a sample and a method for manufacturing the imaging device.

The invention finds applications in the fields of biology and health, in particular in the field of "organ-on-chip".

BACKGROUND

In the fields of neuroscience and medicine, the ability to detect, view and record electrical activity of neurons is key to understanding how the brain functions and malfunctions, and to directly noticing the effects of drugs or other stimuli on the functioning of a population of neurons.

A particularly important application relates to the understanding of neurodegenerative diseases, such as Parkinson's disease or Alzheimer's disease, as well as the development of drugs against these diseases.

Electrophysiological imaging techniques are generally based on an electronic detection/transduction approach.

There are thus commercially available Micro-Electrode Arrays (MEAs) (https://en.wikipedia.org/wiki/Microelectrode_array). Each microelectrode is electrically connected through an electrical connection (via, wire, etc.) to conditioning and addressing electronics.

There are also multi-transistor-array (MTAs). The transistors are then used in an Electrolyte-Oxide-Silicon (EOS) configuration. The paper "Electrical imaging of neuronal activity by multi-transistor-array (MTA) recording at 7.8 μm resolution" by Lambacher et al, Applied Physics A., 2004, thus describes an array of 16384 field effect transistors manufactured using CMOS (complementary metal oxide silicon) technology and covered with a thin insulating layer of titanium dioxide ($TiO_2$).

These imaging devices based on an electronic approach have been optimised to achieve satisfactory spatial resolutions (below 10 μm). However, their field of analysis is limited to 1 $mm^2$ or a few $mm^2$, for example 3.5 $mm^2$, due to the space taken up by electrical connections and electronic circuits.

This limitation prevents the imaging of large populations of neurons, or the testing of several experimental conditions (e.g. several drugs) in parallel on a same device and a same sample.

Furthermore, these electronic devices are complex and expensive to manufacture.

There is therefore a need for electrophysiological imaging devices that are simple to manufacture and for analysing large samples.

This need exists for the study of neuron populations, and more generally for the study of samples comprising at least one source able to generate an electrical signal.

SUMMARY

The invention provides a solution to the problem previously discussed by suggesting using electro-optical transduction capabilities of a PDLC (Polymer-Dispersed Crystal Liquid) film.

A first aspect of the invention relates to a device for imaging electrical activity of a sample, comprising:
- a polymer film in which liquid crystal droplets are dispersed, referred to as a PDLC film,
- a transparent fluidic component in which at least one cavity adapted to contain the sample is arranged,
- a transparent reference electrode, the PDLC film being arranged between said at least one cavity and the reference electrode and configured to convert an electric field created in a region of the PDLC film in response to an electric potential generated by the sample into a variation in transparency of said region of the PDLC film.

The term "transparent" designates a material or element having an optical transmission coefficient greater than 85% for at least one wavelength in the 400-800 nm spectral band.

According to the invention, only three elements are required (a fluidic component with at least one cavity, a PDLC film and a reference electrode) to obtain a device for spatio-temporal viewing of electrical activity of a sample.

The cavity enables the sample to be positioned facing the PDLC film and the reference electrode. It is well adapted to "in-vitro" applications.

The reference electrode is used to detect electric potentials generated in a plurality of regions of the sample.

The PDLC film is used as a transducer, to convert these electric potentials detected into a variation in the transparency state of regions of the PDLC film corresponding to (i.e. facing) the plurality of sample regions. This variation in transparency is measurable by optical imaging.

The PDLC film allows direct viewing, without the use of polarisers and analysers arranged on either side of the film. This absence of polarising elements, further to avoiding potential attenuation of the optical signal, contributes to the simplicity of the imaging device.

The PDLC film further has adaptable mechanical properties (strength, flexibility), which facilitate its integration into the imaging device. The imaging device, already simple in structure, is thus convenient to manufacture.

The PDLC film can furthermore be easily manufactured in dimensions as large as desired, for example 4 cm×4 cm. It also has passive transduction capabilities, i.e. without the need for detection electrodes, electrical connections or electronic addressing circuits which usually limit the number of measurement channels or the surface area of the sensitive surface.

These benefits specific to PDLC film give the imaging device according to the invention, further to its great simplicity, an intrinsic field of analysis that is much greater than the state of the art. The imaging device is thus appropriate for imaging large samples, extending over areas greater than 1 $cm^2$.

The device according to the first aspect of the invention may also have one or more of the following characteristics, considered individually or according to any technically possible combination.

The PDLC film is further configured to vary in transparency at electric potentials in the range 100 μV-100 mV.

Thus, the imaging device is configured to detect and convert into the optical domain electrical signals whose amplitude is typical of extracellular potentials generated by excited cells, as well as neurons.

The liquid crystal droplets of the PDLC film have on average a diameter of between 1 µm and 10 µm, for example between 1 µm and 5 µm.

The droplet diameter determines spatial resolution of the imaging device. The droplet diameter thus specified is less than, or in the range of, the size of neuronal cells. Thus, the imaging device is appropriate for imaging electrical activity of an individual neuron.

The PDLC film has a load rate of the liquid crystal in the polymer of between 10% and 60% by mass.

Thus, the variation in transparency is achieved in response to electric fields in the range of from 0.1 V·µm to 5 V·µm.

The liquid crystal droplets are dispersed in the PDLC film such that that are at least five liquid crystal droplets in the PDLC film in a volume of 10 µm×10 µm×10 µm.

In an embodiment, the liquid crystal droplets are homogeneously dispersed in the polymer film. The term "homogeneous" here means that the number of liquid crystal droplets 110 per unit volume has a variation of less than 5% within the PDLC film. Thus, the transduction capabilities of the PDLC film are substantially the same over the entire surface area of the PDLC film.

Besides, the amount of liquid crystal droplets per unit volume is sufficient for a variation in transparency of at least 30% to be achieved in a region of the PDLC film corresponding to an electrically active region of area 10 µm×10 µm.

As the neurons extend over an area of 10 µm×10 µm, this configuration of the PDLC film ensures that a neuron, regardless of its position facing the PDLC film (and the reference electrode), is associated with a transductive zone of the PDLC film (i.e., a zone whose transparency varies in response to an electric field).

Unlike devices in the state of the art based on array arrangements (of detection electrodes, transistors, etc.), the imaging device is free of non-sensitive zone, i.e. facing which the electrical activity of the sample cannot be detected. The imaging device thus has a better detection efficiency.

The liquid crystal droplets, in an embodiment, comprise dopant particles selected from the following particles: dye nanoparticles, gold nanoparticles, silver nanoparticles, zinc oxide nanoparticles, gold nanowires, silver nanowires.

Thus, the PDLC film is more sensitive and responsive to electric fields in the range of from 2 V and 50 V.

The fluidic component further comprises bias means interacting with the internal volume of said at least one cavity, to bias the sample.

Thus, the device is well adapted to the analysis of a sample immersed in a solution such as a culture solution, for example a neuronal media.

The bias means comprise a transparent electrode, referred to as a counter-electrode.

When the PDLC film responds to an electric field below a bias of 0.1 V and the fluidic component is insulating, the bias means and the reference electrode may be electrically connected to the ground.

Alternatively, the bias means and the reference electrode are electrically connected across a voltage generator to create an electric field in the PDLC film which is equal to or greater than a threshold electric field of the PDLC film from which the variation in transparency of the PDLC film is achieved.

Thus, the electric field generated by the sample is added to the threshold electric field generated by the voltage generator. This configuration makes it possible to take account of the fact that the PDLC film varies in transparency from a threshold electric field.

Said at least one cavity extends to the PDLC film, the polymer of the PDLC film being a material adapted to receive the sample, such as polydimethylsiloxane (PDMS).

Using PDMS as the PDLC film polymer gives the PDLC film sufficient rigidity so that the reference electrode and fluidic component can be assembled from the PDLC film. This thus simplifies manufacture of the device.

Said at least one cavity extends to a transparent and insulating layer disposed between the PDLC film and the cavity.

A second aspect of the invention relates to a system for imaging electrical activity of a sample, comprising:
  An imaging device according to the first aspect of the invention,
  A light source able to emit a light wave,
  An image sensor adapted to form an image of the light transmitted by the imaging device under the effect of electrical activity of the sample,
the imaging device being disposed between the light source and the image sensor, the light source facing one of the elements selected from the transparent electrode and the cavity of the imaging device, and the image sensor being disposed facing the other of said selected elements.

A third aspect of the invention relates to a method for analysing a sample using the imaging device according to the first aspect of the invention, comprising the steps of:
  Disposing the sample in the cavity of the fluidic component of the imaging device, said imaging device being disposed between a light source and an image sensor,
  Illuminating the imaging device and the sample by a light wave produced by the light source, referred to as the incident wave, the incident wave propagating through the imaging device to the image sensor,
  Optically detecting electrical activity of the sample comprising:
    a step of acquiring, by the image sensor, an image representative of the light wave that has been propagated through the imaging device, referred to as the transmitted wave,
    a step of detecting, by a processor communicating with the image sensor, a modification in the transmission properties of the imaging device under the effect of electrical activity of the sample, from the image previously acquired.

The step of detecting the modification in the transmission properties of the imaging device may comprise the following steps of:
  Determining characteristics of the image acquired,
  correlating these characteristics determined with the electric field generated by the sample, from calibration characteristics established by carrying out the steps of arranging the sample, illumination and optical detection using a standard sample.

A fourth aspect of the invention relates to a method for manufacturing a device for imaging electrical activity of a sample, comprising the following steps of:
  Providing a sacrificial substrate,
  Manufacturing a polymer film in which liquid crystal droplets are dispersed, referred to as a PDLC film, the PDLC film being configured to convert an electric field created in a region of the PDLC film in response to an electric potential generated by the sample into a variation in the transparency of said region of the PDLC film, Manufacturing, on a first face of the PDLC film opposite to the sacrificial substrate, a transparent reference electrode, Removing the sacrificial substrate from the PDLC film, so as to leave a second face of the PDLC film opposite to the first face free, Providing a transparent fluidic component in which at least one cavity adapted to contain the sample is arranged, Assembling the fluidic component on the second face of the PDLC film, so that the PDLC film is arranged between said at least one cavity of the fluidic component and the reference electrode.

A fifth aspect of the invention relates to a method for manufacturing a device for imaging electrical activity of a sample, comprising the following steps of:

Providing a transparent substrate,

Manufacturing a transparent reference electrode on the transparent substrate,

Manufacturing, on the reference electrode, a polymer film in which liquid crystal droplets are dispersed, referred to as a PDLC film, the PDLC film being configured to convert an electric field created in a region of the PDLC film in response to an electric potential generated by the sample into a variation in the transparency of said region of the PDLC film, Providing a transparent fluidic component in which at least one cavity adapted to contain the sample is arranged, Assembling the fluidic component on the face of the PDLC film opposite to the reference electrode, so that the PDLC film is arranged between said at least one cavity of the fluidic component and the reference electrode.

The invention and its different applications will be better understood upon reading the following description and upon examining the accompanying figures.

BRIEF DESCRIPTION OF THE FIGURES

The figures are set forth by way of indicating and in no way limiting purposes of the invention.

Unless otherwise specified, a same element appearing in different figures has a single reference.

DETAILED DESCRIPTION

As previously indicated, the present invention especially relates to an imaging device for detecting and viewing electrical activity of a sample, for example a biological sample such as neuronal tissue, or neuronal cells in culture in a culture medium.

The imaging device beneficially has a large field of analysis, greater than 1 cm$^2$, continuity of detection over the entire field of analysis, and micrometric spatial resolution, between 1 µm and 20 µm, corresponding to the scale of an individual neuron.

Figure 1:
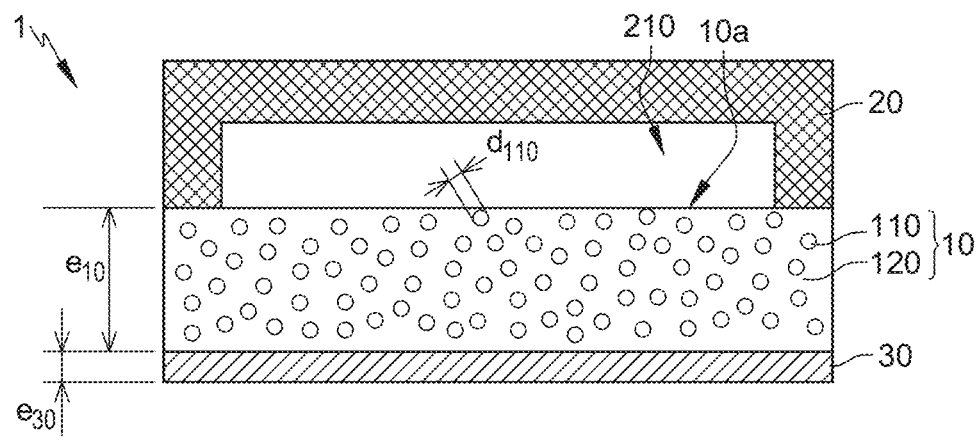
FIG. 1 schematically represents, in a transverse cross-section view, a first embodiment of a device for imaging electrical activity of a sample, FIG. 2 schematically represents, in a transverse cross-section view, a second embodiment of the imaging device, FIG. 3 schematically represents, in a transverse cross-section view, a third embodiment of the imaging device.
Figure 2:
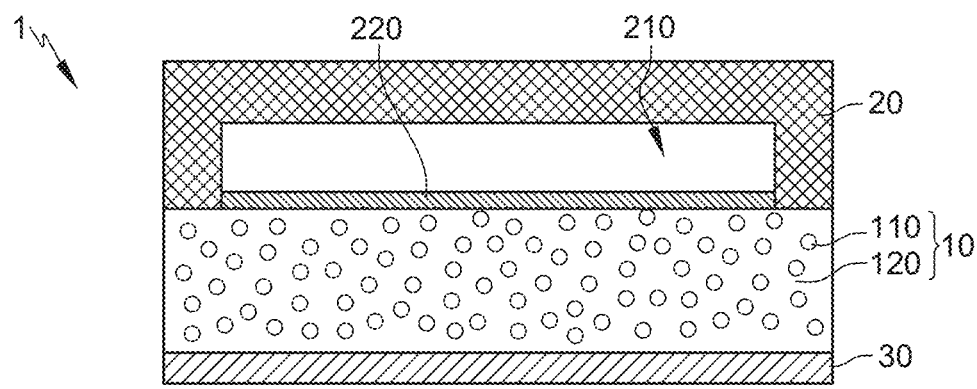

A first embodiment and a second embodiment of the imaging device are represented in FIG. 1 and FIG. 2 respectively.

Figure 3:
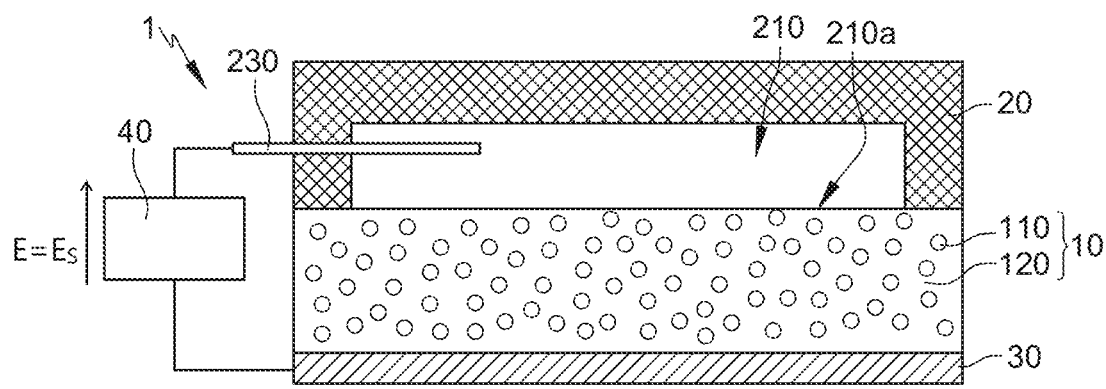

A third embodiment, compatible with the first or second embodiment, is represented in FIG. 3.

Figure 4:
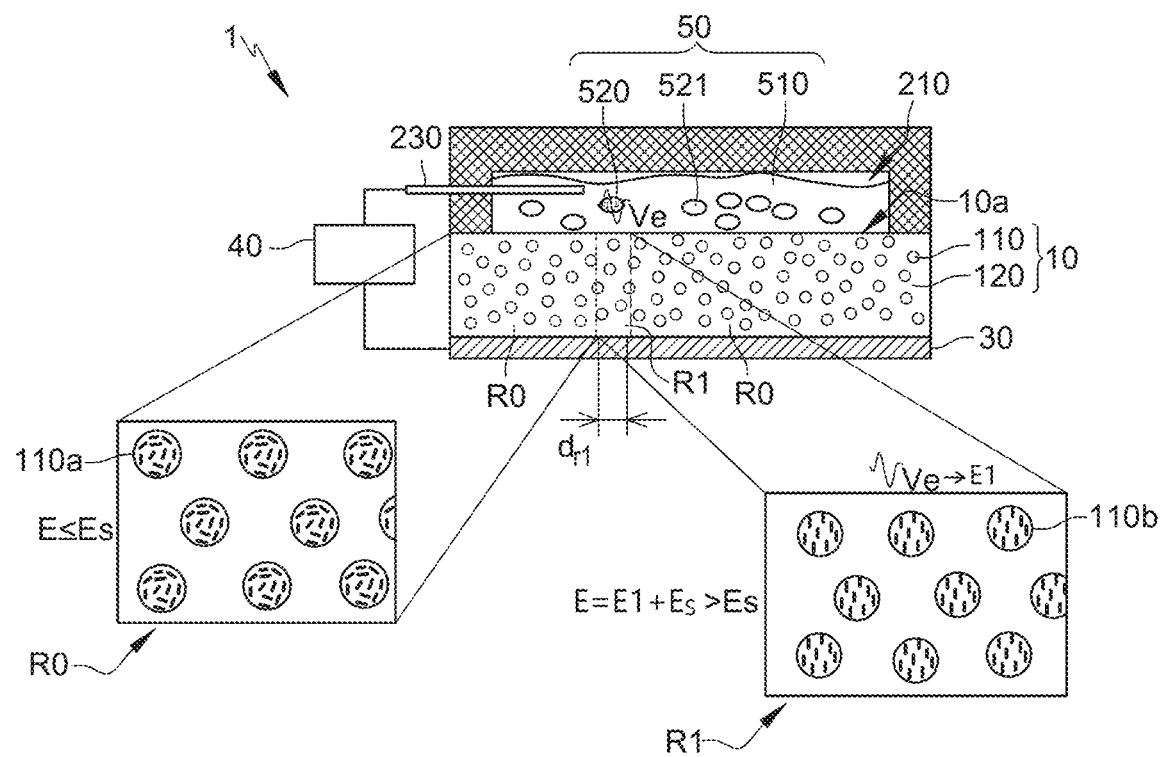
FIG. 4 illustrates the imaging device of FIG. 3 in use with a biological sample.

This third embodiment is also represented in FIG. 4 in use with a sample 50 of neuronal cells 520, 521 immersed in a liquid culture medium 510, such as a neuronal medium. An example of a neuronal medium is a Dulbecco's phosphate buffered saline solution (DBPS).

In common to all three embodiments, the device 1 comprises:
a film 10 of polymer 120 in which droplets of liquid crystal 110 are dispersed, referred to as the PDLC film 10,
a transparent fluidic component 20 in which one or more cavities 210 adapted to contain the sample are arranged, and
a transparent reference electrode 30.

Also in common to all three embodiments, the PDLC film 10 is arranged between the cavity(ies) 210 and the reference electrode 30. As thus illustrated in FIG. 4, the PDLC film 10 is configured to convert an electric field E1 created in a region R1 of the PDLC film 10 in response to an electric potential Ve generated by the sample 50 into a variation in transparency of said region R1 of the PDLC film 10.

The variation in transparency is achieved by virtue of the intrinsic electro-optical properties of the PDLC film 10. These are described hereinafter.

In an embodiment, the reference electrode 30 is in direct contact with the PDLC film 10. It can be formed by depositing a layer of a conductive and transparent material onto the PDLC film 10.

The transparent and insulating material is thereby chosen according to the deposition method to be chemically compatible with the PDLC film 10.

In another configuration, not represented in FIG. 1, the imaging device 1 further comprises a transparent substrate on which the reference electrode 30 has been formed. The reference electrode 30 is then arranged between said transparent substrate and the PDLC film 10.

The transparent substrate may be made of glass or of a transparent polymer material selected from the following polymers: polyethylene terephthalate (PET), polyethylene naphthalate (PEN), polycarbonate (PC).

When the transparent substrate is of a polymer, the reference electrode 30 is beneficially formed by a conductive and transparent material chosen from the following materials: transparent conductive oxides (TCOs), including aluminium-doped zinc oxide (AZO), zinc oxide (ZnO), or by a transparent conductive ink, comprising for example silver (Ag), gold (Au) or poly(3,4-ethylenedioxythiophene) (PEDOT) nanowires.

When the transparent substrate is of glass, the reference electrode 30 comprises a layer of a conductive and transparent material chosen from the following materials: indium tin oxide (ITO), zinc oxide (ZNO), aluminium-doped zinc oxide (AZO), tin oxide ($SnO_2$), silver (Ag), aluminium (Al), titanium (Ti), copper (Cu), or a stack of layers formed by one or more of these materials.

The thickness $e_{30}$ of the reference electrode 30 is, in an embodiment, between 10 µm and 2 mm.

Laterally, the reference electrode 30, in an embodiment, extends over the entire surface of the PDLC film 10.

The fluidic component 20 is formed of a transparent material. This material is, in an embodiment, polymethylsiloxane or PDMS. This material has the benefits of being biocompatible, thus adaptable to the sample 50, and transparent.

The fluidic component 20 may be formed of a material which is further electrically insulating, such as PDMS, or of an electrically conductive material.

With reference to FIG. 1, the fluidic component 20 comprises a cavity 210. As mentioned previously, and with reference to FIG. 4, this cavity 210 is adapted to contain the sample 50.

The dimensions of the cavity 210 are, in an embodiment, between 10 mm² and 100 mm².

The fluidic component 20 may further comprise at least one inlet (not represented in FIG. 4) connected to the cavity 210 to convey the sample 50 into the cavity 210. This inlet is, for example, fitted with a valve for fluidly sealing between cavity 210 and the outside of fluidic component 20. The valve is, in an embodiment, formed of a transparent material, for example PDMS.

Figure 5:
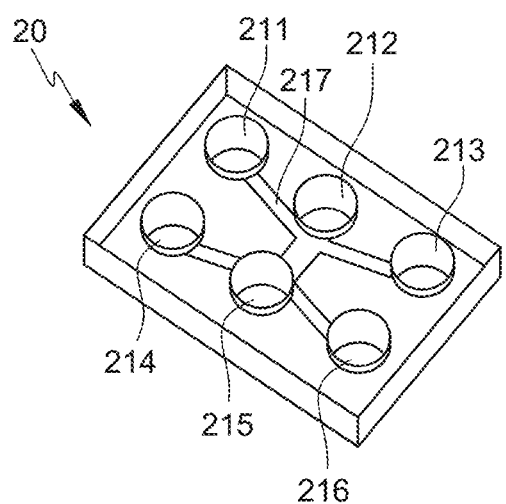
FIG. 5 is a photograph of an example of a fluidic component used in the imaging devices of FIGS. 1 to 3, FIG. 6 schematically represents, in a transverse cross-section view, an imaging system using the imaging device of FIG. 3.

With reference to FIG. 5, the fluidic component 20 may also comprise several cavities, for example six cavities 211, 212, 213, 214, 215 and 216, interconnected by ducts 217 in the case of a biological sample, these ducts 217 are adapted to the culture solutions 50.

These cavities, in an embodiment, have dimensions of between 1×1 mm and 10×10 mm.

Each cavity 211-216 thereby faces the PDLC film 10 and the reference electrode 30.

The PDLC film 10 is a film of a composite material comprising a polymer material and a liquid crystal. This composite material is formed by polymerising a mixture of a solution of the polymer and a solution of a liquid crystal material (or, more simply, of a liquid crystal). Under the effect of polymerisation, and with reference to FIG. 1, the liquid crystal is in the form of droplets 110 discretely dispersed (separated from one another) in the network of the polymer 120.

The PDLC film 10, in an embodiment, has a thickness $e_{10}$ which depends on the size of the droplets 110. The minimum thickness may be 5 µm.

Laterally, the PDLC film 10 may extend over dimensions as large as desired. For example, it extends over dimensions greater than 1 mm×1 mm, for example greater than 1 cm×1 cm, for example 4 cm×4 cm.

The PDLC film can operate in a so-called "normal" mode, i.e. the PDLC film 10 has the property of varying between an opaque or semi-transparent state (off state) and a transparent state (on state) after applying an electric field perpendicular to the plane of the PDLC film 10. However, other modes of use (inverse, etc.) may be contemplated.

In the first embodiment represented by FIG. 1, cavity 210 extends up to PDLC film 10. In other words, it opens onto the PDLC film 10. The polymer of the PDLC film 10 is thereby a material adapted to receive the sample, such as polydimethylsiloxane (PDMS). PDMS is beneficially biocompatible, i.e. adapted to receive biological samples.

In the second embodiment represented by FIG. 2, the cavity 210 does not extend up to the PDLC film 10 but up to a transparent and insulating layer 220, disposed between the PDLC film 10 and the cavity 210. This transparent insulating layer 220, in an embodiment, forms part of the fluidic component 20. The benefit of using such an intermediate layer is to improve mechanical strength of the imaging device 1. This embodiment is favoured when the film has insufficient rigidity to directly support (i.e. via direct contact) the fluidic component 20.

In the third embodiment represented by FIG. 3, the imaging device 1 further comprises a counter-electrode 230 used as bias means, this transparent counter-electrode 230 being at least partly arranged in the cavity 210 to bias the sample 50. The counter-electrode 230 is, in an embodiment, formed of a conductive and transparent material.

For example, the counter-electrode 230 is in the form of a rod which passes through a wall of the fluidic component 20 to end into the cavity 210.

Alternatively, the counter-electrode 230 may take the form of a conductive layer disposed on an internal surface of the fluidic component 20 (delimiting the cavity 210), other than the bottom 210a (see FIG. 3) of the cavity 210, for example on one of the side walls of the cavity 210 or on the surface 10a of the PDLC 10.

Another possibility is that the counter-electrode 230 may be formed of a conductive and transparent layer disposed on the bottom 210a of the cavity 210. The fact that it is transparent allows light to pass through the imaging device 1, for optical imaging.

It will be noted that when the fluidic component 20 is formed of a conductive material, the walls and bottom 210a of the cavity 210 are also conductive. In this case, the cavity 210 intrinsically forms the counter-electrode 230.

When the fluidic component is formed of an insulating material and the counter-electrode 230 is not formed of a conductive and transparent layer disposed on the bottom 210a of the cavity 210, the sample bias means (comprising the counter-electrode 230) and the reference electrode 30 may be:
  either electrically connected to the ground (configuration not represented in FIG. 3) when the PDLC film responds to an electric field below a bias of 0.1 V,
  or electrically connected across a voltage generator 40 to create an electric field E in the PDLC film equal to or greater than a threshold electric field Es of the PDLC film from which the variation in transparency of the PDLC film is achieved. This threshold electric field Es typically corresponds to a bias between the reference electrode 30 and the counter-electrode 230 of between 3 V and 5 V.

When the fluidic component is formed of a conductive material or when the counter-electrode 230 is formed of a conductive and transparent layer disposed on the bottom 210a of the cavity 210, the bias means are electrically connected at the terminals of the voltage generator 40.

Thus, the bias means 230 make it possible to configure the initial electric field Es (i.e. in the absence of electrical activity of the sample) in the PDLC film 10.

The operating principle of the imaging device 1 is described hereinafter in connection with FIG. 4.

The reference electrode 30 acts as a means for generating an electric field E1 in a region R1 of the PDLC film 10 in response to the electrical activity Ve of a neuron 520.

When the sample 50 is not electrically active, an electric field Es pre-exists in the PDLC film 10, created under the effect of the voltage generated between the reference electrode 30 and the counter-electrode 230 by the voltage generator 40.

When a region 520 of the sample 50 is electrically active, charges accumulate at this active region 520, generating an electric potential Ve. This electric potential Ve leads to a field E1 which is added locally (i.e. in the zone R1 of the active region 520) to the electric field Es created in the PDLC film 10 by the voltage generator 40. The resulting electric field E is therefore greater than the threshold electric field Es.

When there is no voltage generator 40 and the reference electrode 30 is brought to the ground, the operating principle is identical, with the difference that the pre-existing electric field in the PDLC film 10 is zero.

It should be noted that the imaging device operates in the same way when no bias means are used, as in the first and second embodiments. Simply, the reference electrode 30 is brought to the ground, and the pre-existing electric field depends on the bias of the sample.

The PDLC film serves as an electro-optical transducer to convert electric potentials into a variation in the transparency of the PDLC film in the zone R1 of the active region 520. In other zones R0 of the PDLC film 10, since the voltage between the reference electrode 30 and the sample 50 is less than or equal to the threshold voltage Vs, the transparency has not been changed from the off state (the film is opaque or semi-transparent in these zones R0).

The variation in transparency is related to birefringence properties of the liquid crystal droplets 110.

Thus, with reference to FIG. 4, when no electric field is applied, or when it is less than the threshold electric field $E_S$ of the PDLC film, the liquid crystal molecules in the droplets 110a are randomly oriented with respect to each other. There are therefore refractive index differences between each droplet 110a and the polymer 120, which brings about diffusion: the region R0 of the PDLC film 10 appears to be opaque.

On the other hand, when the applied electric field E1 is greater than the threshold field of the PDLC film 10, the director axis of each droplet 110b aligns in the same direction. Thus, the refractive index between each droplet 110b is the same and the region R1 of the PDLC film 10 appears to be transparent (disappearance of diffusion).

The transduction capabilities of the PDLC film 10 are thus passive: there is no need for electronic circuits to condition the electric potentials generated by the sample or the transducer output signals.

The fact that the PDLC film 10 responds to electric fields and not to electric currents avoids the use of a counter-electrode which would be disposed on the other side of the PDLC film 10 from the reference electrode 30, and which would have the function of bringing the electric potentials of the sample to the PDLC film 10.

Beneficially, the PDLC film has a homogeneous distribution of liquid crystal droplets 110. The term "homogeneous" here means that the number of liquid crystal droplets 110 per unit volume has a variation of less than 5% within the PDLC film. Thus, transduction capabilities of the PDLC film are substantially the same over the entire surface area of the PDLC film. Stated differently, the transduction capacities of the film are spatially regular and continuous.

In an embodiment, the droplet distribution is such that there are at least five droplets of liquid crystal 110 in a volume of 10 μm×10 μm×10 μm of the PDLC film 10.

As the neurons extend over an area of 10 μm×10 μm, this configuration of the PDLC film ensures that a neuron, whatever its position with respect to the PDLC film (and the reference electrode), is associated with a transductive zone of the PDLC film (i.e. a zone whose transparency varies in response to an electric field). With reference to FIG. 4, an active neuron 520 is associated with a transduction region R1 that has a diameter dr1 equal to the diameter of the active neuron 520.

More generally, the spatial resolution is no longer limited, as is the case in devices of prior art based on array transducers, by the pitch of the array.

The liquid crystal droplets 110 beneficially have a mean diameter $d_{110}$ of between 1 μm and 10 μm, for example of between 1 μm and 5 μm.

The spatial resolution is thus adapted to the scale of a neuron, which has a size of 15 μm.

The polymer of the PDLC film 10 is for example a MOA-65 Norland polymer having a refractive index equal to 1.524.

The liquid crystal is a nematic liquid crystal. It is for example MERCK MDA003969 liquid crystal having an ordinary refractive index $n_o$ 1.498, an extraordinary refractive index $n_e$ 1.719, and an isotropic temperature of 106° C. It exhibits an anisotropy of index $\Delta_\varepsilon$ equal to 2.7 at a frequency greater than or equal to 50 kHz.

In addition, the load rate of liquid crystal in the polymer can be between 10% and 60%.

Thus, the variation in transparency is achieved in response to electric fields in the range of from 30 mV·μm to 100 mV·μm, which corresponds to the range of electric fields generated by a biological sample such as sample 50.

The liquid crystal droplets may comprise dopant particles selected from the following particles: dye nanoparticles, gold nanoparticles, silver nanoparticles, ZnO nanoparticles, gold nanowires, silver nanowires. A method for encapsulating dopants in PDLC films is described, for example, in document "Preparation and electrooptic study of reverse mode polymer dispersed liquid crystal: performance augmentation with the doping of nanoparticles and dichroic dye", by Vandna Sharma et al, Journal of Applied Polymer Science, 48745, 2020.

These dopant particles have the effect of increasing sensitivity of the PDLC film 10. In other words, the PDLC film can vary in transparency in response to electric fields with an amplitude of between 10 mV·μm and 1 V·μm, thus covering the range of electric fields generated by neurons. On the other hand, as the surface area of the PDLC film 10 is centimetric, an imaging device 1 which combines a large field of analysis with micrometric spatial resolution is available.

Figure 6:
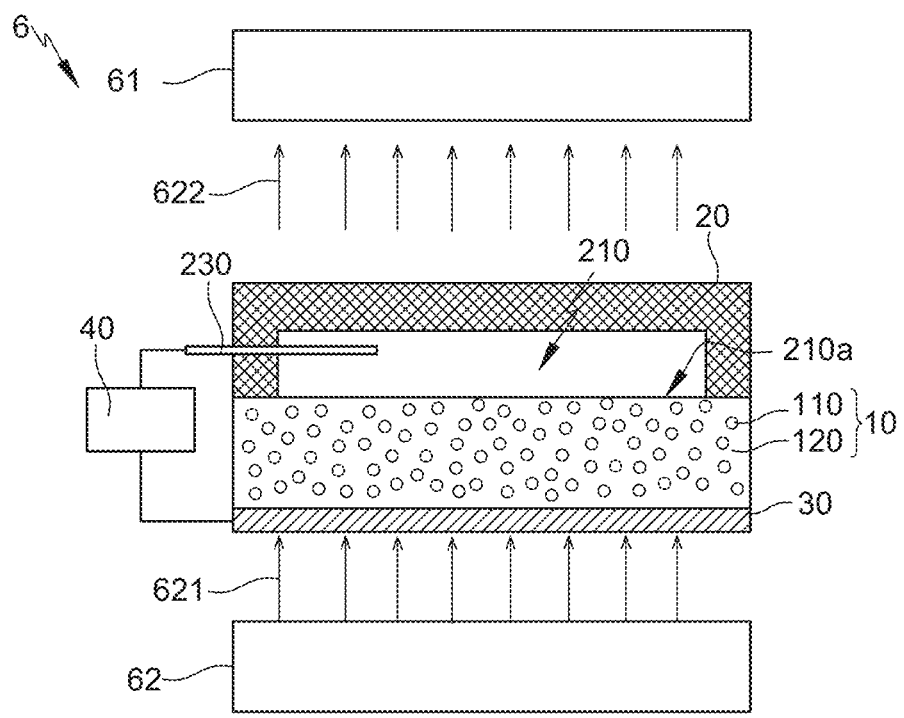

FIG. 6 represents an imaging system 6 for imaging electrical activity of a sample using the imaging device 1 described previously.

With reference to FIG. 6, the imaging system 6 comprises:
The imaging device 1 according to any of the embodiments,
A light source 62 disposed facing the reference electrode 30 and the cavity 210 of the imaging device 1, adapted to emit light 621 towards the imaging device 1,
An image sensor 61 disposed facing the cavity 210, and adapted to form an image of the light 622 transmitted by the imaging device 1 under the effect of the electrical activity of the sample.

The imaging device 1 is thus disposed between the light source 62 and the image sensor 61.

The light source 62 is, for example, a white light source. It may comprise optical elements (polariser, lenses, optical fibres, etc.) for routing and/or shaping emitted light 621.

The image sensor 61 is, for example, a CCD (Charged Coupled Device) sensor integrated into a microscope.

The light source 62 and the image sensor 61 can be interchanged with respect to the imaging device 1.

This imaging system 6 allows the electrical activity of the sample to be imaged simply and directly.

Figure 7:
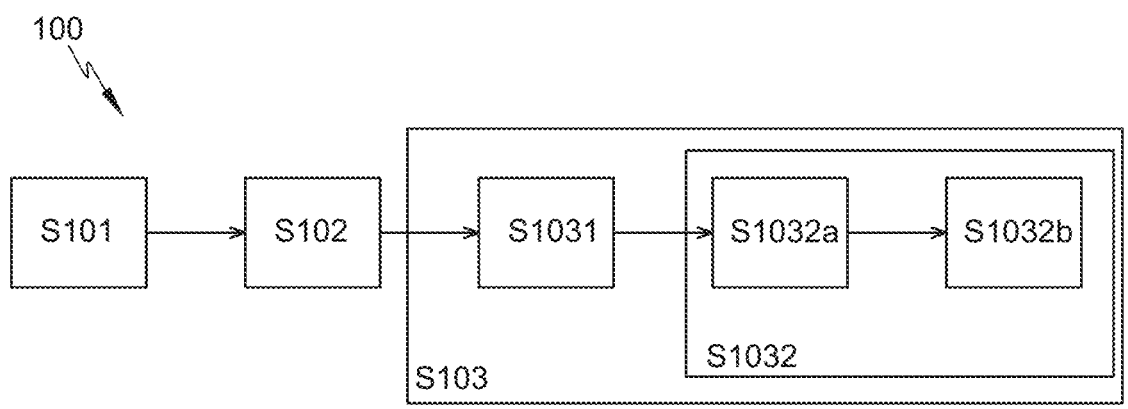
FIG. 7 is a block diagram illustrating the sequence of the main steps in a method for analysing electrical activity of a sample, FIG. 8A to 8H schematically represent, in transverse cross-section view, steps or sub-steps of a manufacturing method the imaging device of FIGS. 1 to 3, and FIG. 9A to 9F schematically represent, in transverse cross-section view, steps or sub-steps of a method for manufacturing as an alternative to the manufacturing method in FIGS. 8A to 8H.

A method 100 for analysing the sample 50 using the imaging device 1 is described hereinafter in connection with FIG. 7.

The analysis method 100 comprises the following main steps:
- Disposing S101 the sample 50 in the cavity 210 of the fluidic component 20 of the imaging device 1, said imaging device 1 being disposed between a light source and an image sensor such as the light source 62 and the image sensor 4 of the imaging system 6 previously described (cf. FIG. 6). The sample is, in an embodiment, introduced into the cavity once it has been assembled on the assembly formed by the PDLC film and the electrode 30.
- Illuminating S102 the imaging device 1 and the sample 50 by a light wave 622 produced by the light source 62, referred to as the incident wave 622, the incident wave 621 propagating through the imaging device 1 to the image sensor 61,
- Optically detecting S103 the electrical activity of the sample 50 comprising:
  - a step S1031 of acquiring, by the image sensor 61, an image representative of the light wave 622 that has been propagated through the imaging device 1, referred to as the transmitted wave 621,
  - a step S1302 of detecting, by a processor communicating with the image sensor, a modification in the transmission properties of the imaging device 1 under the effect of the electrical activity of the neurons 520, 521 of the sample, from the previously acquired image.

The step of detecting S1032 the modification in the transmission properties of the imaging device 1 may comprise the following steps of:
- Determining S1032a characteristics of the acquired image, such as regions of interest, mean value of pixels in this region of interest, etc.
- Correlating S1032b these characteristics determined with the location of the electrically active region of the sample 520 and of the electric potential generated by this region 520, from calibration characteristics established by performing steps S101, S102 and S103 of disposing the sample, illuminating and optically detecting using a standard sample.

A method for manufacturing the imaging device 1 is described hereinafter. Generally speaking, it comprises the following steps of:
- Manufacturing the PDLC film 10,
- Providing the fluidic component 20,
- Manufacturing the reference electrode 30,
- Assembling the PDLC film 10, the reference electrode 30, and the fluidic component 20 so that the PDLC film 10 is arranged between the cavity(ies) 210 of the fluidic component 20 and the reference electrode (30).

A first embodiment of this manufacturing method is illustrated in FIGS. 8A to 8H.

According to this first embodiment, the PDLC film 10 is first manufactured and serves as a support for the manufacture of the reference electrode 30.

According to this first embodiment, the method 7 begins with step S701, illustrated in FIG. 8A, of providing a sacrificial substrate 710.

Step S701 continues with a step S702 of manufacturing the PDLC film 10 on the sacrificial substrate 710.

Manufacturing comprises a first sub-step S702A, illustrated in FIG. 8B, of spin coating the mixture of the polymer solution and of the liquid crystal solution, and a second sub-step S702B, illustrated in FIG. 8C, of polymerising, for example by exposure to UV light, the mixture deposited in step S702A.

Step S702 is followed by a step S703, illustrated in FIG. 8D, of forming the reference electrode 30 on a first face 10b of the PDLC film opposite to the sacrificial substrate 710.

Step S703 continues with a step S704, illustrated in FIG. 8E, of removing the sacrificial substrate 710 from the PDLC film 10.

With reference to FIG. 8F, at the end of this step S704, a second face 10c of the PDLC film 10 opposite to the first face 10b is left free, and the PDLC film 10 and the reference electrode 30 have been assembled to form a PDLC film-reference electrode assembly 1030.

Steps S705 and S706 are illustrated in FIG. 8G. Step S705 is a step of providing the fluidic component 20.

Step S706 consists in assembling the fluidic component 20 onto the second face 10c of the PDLC film 10 so that said cavity 210 faces the reference electrode 30, the PDLC film 10 then being arranged between the cavity 210 and the reference electrode 30.

Two additional steps S707 and S708, illustrated in FIG. 8H, are then carried out successively, respectively, to make the bias means 230 of the fluidic component 20, and to electrically connect these bias means. Step S706 thus consists in inserting the counter-electrode 230 into the cavity 210 through the wall of the fluidic component 20. Step S707 consists in providing the voltage generator 40 and electrically connecting its terminals on the one hand to the reference electrode 30 and on the other hand to the counter-electrode 230.

At the end of step S707, the PDLC film-reference electrode assembly 1030 and the fluidic component 20 have been assembled, and the imaging device 1 is ready for use.

A second embodiment of the manufacturing method is illustrated in FIGS. 9A to 9F.

The method 8 according to this second embodiment differs from the first embodiment in that the reference electrode 30 is formed on a transparent substrate and serves as a support for manufacturing the PDLC film 10. Such an embodiment will be favoured when the rigidity of the PDLC film 10 is insufficient to serve as a support for the reference electrode 30.

Figure 9A:
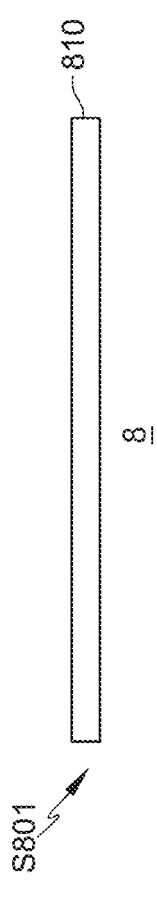

The method 8 thus begins with a step S801, illustrated in FIG. 9A, of providing the transparent substrate 810.

Figure 9B:
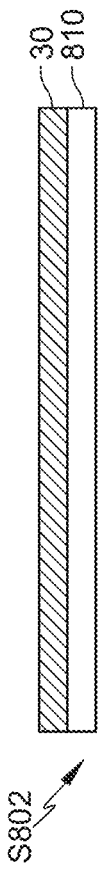

The method 8 continues with a step S802, illustrated in FIG. 9B, of manufacturing the reference electrode 30 on the transparent substrate 810.

Method 8 continues with step S803, which consists in fabricating the PDLC 10 film on the reference electrode 30. The reference electrode is thus disposed on the first face 10b of the PDLC film 10.

Figure 9C:
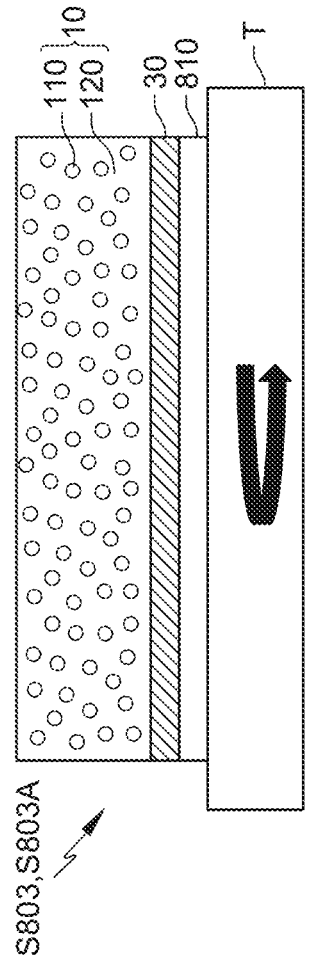
Figure 9D:
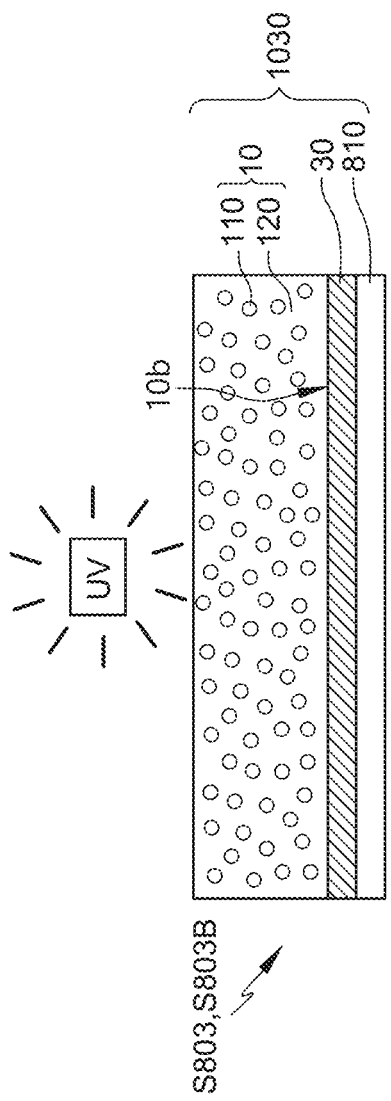

This step S803 comprises the sub-steps S803A and S803B, illustrated in FIG. 9C and FIG. 9D respectively.

These sub-steps are identical to sub-steps S702A and S702B illustrated in FIGS. 8B and 8C.

Step S803 is followed by steps S804 and S805, illustrated in FIG. 9E, and steps S806 and S807, illustrated in FIG. 9F. These steps S804, S805, S806 and S807 are identical, respectively, to steps S705, S706, S707 and S708 illustrated in FIGS. 8G and 8H.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

It will be appreciated that the various embodiments and aspects of the inventions described previously are combinable according to any technically permissible combinations. For example, various aspects of the present disclosure may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. The different characteristics described and/or claimed may be beneficially combined. Their presence in the description or in the different dependent claims do not exclude this possibility. The reference signs cannot be understood as limiting the scope of the invention.

The invention claimed is:

1. A device for imaging electrical activity of a sample, comprising:
    a PDLC film of polymer in which droplets of liquid crystal are dispersed,
    a transparent fluidic component wherein at least one cavity adapted to contain the sample is arranged,
    a transparent reference electrode,
    the PDLC film being arranged between said at least one cavity and the reference electrode and configured to convert an electric field created in a region of the PDLC film in response to an electric potential generated by the sample into a variation in transparency of said region of the PDLC film.

2. The imaging device according to claim 1, wherein the PDLC film is further configured to vary in transparency at electric potentials in the range 100 µV-100 mV.

3. The imaging device according to claim 1, wherein the liquid crystal droplets of the PDLC film have on average a diameter of between 1 µm and 10 µm.

4. The imaging device according to claim 3, wherein the diameter is between 1 µm and 5 µm.

5. The imaging device according to claim 1, wherein the PDLC film has a load rate of liquid crystal in the polymer of between 10% and 60% by mass.

6. The imaging device according to claim 1, wherein the liquid crystal droplets are homogeneously dispersed in the PDLC film such that there are at least five liquid crystal droplets in a volume of 10 µm×10 µm×10 µm in the PDLC film.

7. The imaging device according to claim 1, wherein the liquid crystal droplets comprise dopant particles selected from the following particles: dye nanoparticles, gold nanoparticles, silver nanoparticles, ZnO nanoparticles, gold nanowires, silver nanowires.

8. The imaging device according to claim 1, wherein the fluidic component further comprises bias means interacting with the internal volume of said at least one cavity, to bias the sample.

9. The imaging device according to claim 8, wherein the bias means comprise a transparent electrode, forming a counter-electrode.

10. The imaging device according to claim 8, wherein the bias means and the reference electrode are electrically connected to the ground, the fluidic component being formed of an electrically insulating material.

11. The imaging device according to claim 8, wherein the bias means and the reference electrode are electrically connected to the terminals of a voltage generator to create an electric field in the PDLC film equal to or greater than a threshold electric field of the PDLC film from which the variation in transparency of the PDLC film is achieved.

12. The imaging device according to claim 1, wherein said at least one cavity extends up to the PDLC film, the polymer of the PDLC film being a material adapted to receive the sample.

13. The imaging device according to claim 12, wherein the material is PDMS.

14. The imaging device according to claim 1, wherein said at least one cavity extends to a transparent and insulating layer disposed between the PDLC film and the cavity.

15. A system for imaging electrical activity of a sample, comprising:
    an imaging device according to claim 1,
    a light source able to emit a light wave,
    an image sensor adapted to form an image of the light transmitted by the imaging device under the effect of electrical activity of the sample,
    the imaging device being disposed between the light source and the image sensor, the light source facing one of the elements selected from the reference electrode and the cavity of the imaging device, and the image sensor facing the other of said elements selected.

16. A method for analysing a sample using an imaging device according to claim 1, comprising:
    disposing the sample in the cavity of the fluidic component of the imaging device, said imaging device being disposed between a light source and an image sensor,
    illuminating the imaging device and the sample by an incident light wave produced by the light source, the incident wave propagating through the imaging device to the image sensor,
    optically detecting electrical activity of the sample comprising:
        acquiring, by the image sensor, an image representative of a transmitted light wave that has been propagated through the imaging device,
        detecting, by a processor communicating with the image sensor, a modification in the transmission properties of the imaging device under the effect of electrical activity of the sample, from the previously acquired image.

17. The analysis method according to claim 16, wherein the detecting of the modification in the transmission properties of the imaging device comprises:
determining characteristics of the image acquired, and
correlating said characteristics determined with the electric field generated by the sample, from calibration characteristics established by carrying out the disposing of the sample, the illuminating and the optically detecting using a standard sample.

18. A method for manufacturing a device for imaging electrical activity of a sample, comprising:
providing a sacrificial substrate,
manufacturing a PDLC film of polymer in which droplets of liquid crystal are dispersed, the PDLC film being configured to convert an electric field created in a region of the PDLC film in response to an electric potential generated by the sample into a variation in transparency of said region of the PDLC film,
manufacturing, on a first face of the PDLC film opposite to the sacrificial substrate, a transparent reference electrode,
removing the sacrificial substrate from the PDLC film, so as to leave a second face of the PDLC film opposite to the first face free,
providing a transparent fluidic component in which at least one cavity adapted to contain the sample is arranged, and
assembling the fluidic component to the second face of the PDLC film, so that the PDLC film is arranged between said at least one cavity of the fluidic component and the reference electrode.

19. A method for manufacturing a device for imaging electrical activity of a sample, comprising:
providing a transparent substrate,
manufacturing a transparent reference electrode on the transparent substrate,
manufacturing, on the reference electrode, a PDLC film of polymer in which droplets of liquid crystal are dispersed, the PDLC film being configured to convert an electric field created in a region of the PDLC film in response to an electric potential generated by the sample into a variation in transparency of said region of the PDLC film,
providing a transparent fluidic component in which at least one cavity adapted to contain the sample is arranged,
assembling the fluidic component on the face of the PDLC film opposite to the reference electrode, so that the PDLC film is arranged between said at least one cavity of the fluidic component and the reference electrode.

* * * * *